(12) United States Patent
Hebsur

(10) Patent No.: US 6,391,811 B1
(45) Date of Patent: May 21, 2002

(54) PEST RESISTANT MOSI$_2$-BASED MATERIALS CONTAINING IN-SITU GROWN β-SI$_3$N$_4$ WHISKERS

(75) Inventor: Mohan G. Hebsur, North Olmsted, OH (US)

(73) Assignee: Ohio Aerospace Institute, Cleveland, OH (US)

( * ) Notice: Subject to any disclaimer, the term of this patent is extended or adjusted under 35 U.S.C. 154(b) by 0 days.

(21) Appl. No.: 09/883,713

(22) Filed: Jun. 18, 2001

Related U.S. Application Data

(62) Division of application No. 09/500,497, filed on Feb. 9, 2000, now Pat. No. 6,288,000.

(51) Int. Cl.$^7$ .......................... C04B 35/81; C04B 35/58
(52) U.S. Cl. ..................... 501/95.3; 501/96.3; 501/97.4
(58) Field of Search ........................ 501/92, 95.2, 95.3, 501/97.4

(56) References Cited

U.S. PATENT DOCUMENTS

| | | |
|---|---|---|
| 4,923,829 A | 5/1990 | Yasutomi et al. |
| 4,927,792 A | 5/1990 | Petrovic et al. |
| 4,970,179 A | 11/1990 | Petrovic et al. |
| 5,000,896 A | 3/1991 | Petrovic et al. |
| 5,069,841 A | 12/1991 | Petrovic et al. |
| 5,240,782 A | 8/1993 | Bose et al. |
| 5,281,565 A | 1/1994 | Hecht et al. |
| 5,292,691 A | 3/1994 | Hecht et al. |
| 5,292,692 A | 3/1994 | Maloney et al. |
| 5,308,806 A | 5/1994 | Maloney et al. |
| 5,429,997 A | 7/1995 | Hebsur |

OTHER PUBLICATIONS

Mohan G. Hebsur, Development and Characterization of SiCf/MoSi2–Si3N4p hybrid composites, Materials Science and Engineering, vol. A261, 1999 pp 24–37 No Month.

N.S. Stoloff, An overview of powder processing of silicides and their composites, Materials Science and Engineering, vol. A261, 1999 pp 169–180 No Month.

J.J. Petrovic, A.K. Vasudevan, Key developments in high temperature structural silicides, Materials Science and Engineering, vol. A261, 1999 pp 1–5 No Month.

P. Peralta, R. Dickerson, J.R. Michael, K.J. McClellan, F. Chu, T.E. Mitchell, Residual thermal stresses in MoSi2–Mo5Si3 in–situ composites, Materials Science and Engineering, vol. A261, 1999 pp 261–269 No Month.

D.E. Alman, J.H. Tylczak, J.A. Hawk, M.G. Hebsur, Solid particle erosion behavior of an Si3N4–MoSi2 composite at room and elevated temperatures, Materials Science and Engineering, vol. A261, 1999 pp 245–251 No Month.

Robert W. Kowalik, Mohan G. Hebsur, Cyclic oxidation study of MoSi2–Si3N4 base composites, Materials Science and Engineering, vol. A261, 1999 pp. 300–303 No Month.

K. Yamada, N. Kamiya, High temperature mechanical properties of Si3N4–MoSi2 and Si3N4–SiC composites with network structures of second phases, Materials Science and Engineering, vol. A261, 1999 pp 270–277 No Month.

K. Sadananda, C.R. Feng, R. Mitra, S.C. Deevi, Creep and fatigue properties of high temperature silicides and their composites, Materials Science and Engineering, vol. A261, 1999 pp 223–238 No Month.

Michael J. Maloney, Ralph J. Hecht, Development of continuous–fiber–reinforced MoSi2–base composites, Materials Science and Engineering, vol. A155, 1992 pp 19–31 No Month.

*Primary Examiner*—Karl Group
(74) *Attorney, Agent, or Firm*—Pearne & Gordon LLP

(57) ABSTRACT

A MoSi$_2$ pest resistant material includes in-situ grown β-Si$_3$N$_4$ whiskers. In addition to excellent pest resistance, the material provides a lower coefficient of thermal expansion for better match with continuous reinforcing fibers such as SiC fibers. A two stage heating and pressing production technique enables lower temperature processing with substantially full densification.

10 Claims, 2 Drawing Sheets

PEST RESISTANT MOSI₂-BASED MATERIALS CONTAINING IN-SITU GROWN β-SI₃N₄ WHISKERS

This application is a division of application Ser. No. 09/500,497, filed Feb. 9, 2000, now U.S. Pat. No. 6,288,000.

This invention was made with Government support under Contract No. NCC-3-637 by NASA. The Government has certain rights to the invention.

BACKGROUND OF THE INVENTION

The present invention relates to intermetallic materials based on $MoSi_2$, intermetallic matrix composites and methods of making the same. More particularly, the invention is directed to a $MoSi_2$ based material having an engineered micro-structure provided through the use of in-situ reinforcement whiskers.

$MoSi_2$ is an attractive intermetallic for structural applications due to its excellent high-temperature oxidation resistance, low density and high thermal conductivity. However, it is brittle at low temperatures, weak at high temperatures and suffers from accelerated oxidation at intermediate temperatures. The accelerated oxidation of $MoSi_2$ at intermediate temperatures causes the material to disintegrate into powder, a phenomenon known as pesting.

Pesting is a general term describing the catastrophic oxidation of intermetallic materials at intermediate temperatures. The accelerated oxidation leads to the disintegration of the material and component failure. For $MoSi_2$ the temperature at which pesting is most pronounced is approximately 500° C. It has been observed that at 500° C. bulk (i.e., non-composite) $MoSi_2$, as well as, composites of $MoSi_2$ with alumina and aluminum nitride also suffer total disintegration within relatively short time periods, e.g. 100 hours.

The pested samples yield powdery products consisting of $MoO_3$ whiskers, $SiO_2$ clusters, and residual $MoSi_2$. The $MoO_3$ whiskers exhibited protruding characteristics and were concentrated at the grain boundaries and cracks. The pesting phenomenon in $MoSi_2$ has been concluded to be the result of the formation of voluminous molybdenum oxides in microcracks. While not wanting to be bound by theory, the accelerated oxidation apparently involves the simultaneous formation of $MoO_3$ and $SiO_2$ in amounts essentially determined by the Mo and Si concentrations in the intermetallic.

The addition of about 30 to 50 volume percent of $Si_3N_4$ particulate to $MoSi_2$ reduced the pesting by forming a protective oxide scale as disclosed in assignee's related U.S. Pat. No. 5,429,997, the teachings of which are hereby incorporated by reference. In addition, improvements in room temperature fracture toughness, reductions in the 1200° C. compressive creep rates and lowered coefficient of thermal expansion were attained. Additional improvements in toughness and elevated temperature strength were achieved by reinforcing the $MoSi_2$—$Si_3N_4$ matrix with about 30 volume percent of silicon carbide continuous fibers. The use of fiber reinforcement is not entirely satisfactory due to the high costs of the present state-of-the-art techniques for making fiber reinforced, composites.

A further difficulty with the use of fiber reinforcement is the coefficient of thermal expansion mismatch between $MoSi_2$ and most potential reinforcing materials. $MoSi_2$ has a relatively high coefficient of thermal expansion as compared to most potential reinforcing materials such as silicon carbide fibers. The coefficient of thermal expansion mismatch between the fiber and the matrix material tends to result in matrix cracking during fabrication and severe matrix cracking during thermal cycling which in turn results in component failure. Possible reinforcing fibers include high strength ceramic fibers such as silicon carbide, single crystal alumina, and ductile, high strength molybdenum and tungsten alloy fibers. Ductile niobium fibers have shown improvements in low temperatures strength and toughness, but a severe reaction between the fiber and $MoSi_2$ limits its use and, in any case, it does not provide improved high-temperature characteristics. The addition of silicon carbide whiskers has yielded improvements in room temperature toughness, but pesting and coefficient of thermal expansion mismatch continue to be problems.

SUMMARY OF THE INVENTION

It has now been discovered that a $MoSi_2$ based material may be provided with an engineered micro-structure through processing and composition control. In-situ reinforcement of whisker type $\beta$-$Si_3N_4$ grains in a $MoSi_2$ matrix offers a unique combination of attributes. The in-situ reinforcement is believed to provide a more tortuous crack path with elongated grains or whiskers which lead to crack bridging and deflection resulting in very high fracture toughness.

The invention contemplates a new $MoSi_2$ based alloy composition which exhibits excellent pest resistance at low temperatures (400 to 600° C.), good coefficient of thermal expansion match with potential fiber reinforcement, excellent oxidation resistance at elevated temperatures and high fracture toughness enabling its use as a monolithic material. Accordingly, a $MoSi_2$-based matrix contains a high-volume fraction of randomly oriented in-situ grown long whisker type grains of $\beta$-$Si_3N_4$ in the $MoSi_2$ matrix. The matrix is characterized in part by a toughened micro-structure, lower density, lower coefficient of thermal expansion, excellent resistance to pest attack, and it is much stronger than the binary $MoSi_2$ material.

The invention also contemplates processing conditions to achieve fully dense alloys with engineered microstructure through the use of sintering aids to grow the long whiskers of $\beta$-$Si_3N_4$ in the matrix. During processing, high-temperature and pressure conditions are used to convert the $\alpha$-$Si_3N_4$ particles to randomly oriented $\beta$-$Si_3N_4$ long whiskers. Suitable sintering aids include rare earth oxides.

It is presently believed that the improved pesting is related to the formation of more protective silicon oxy nitride, $Si_2ON_2$, and/or mullite/$SiO_2$ oxide scales that suppress the formation of non-protective $MoO_3$. The invention also contemplates forming an outer protective layer of $Al_2O_3 \cdot SiO_2$ followed by an inner layer of $SiO_2$ for better oxidation resistance in reducing or low partial pressure oxygen atmospheres.

The invention also contemplates the use of the $MoSi_2$-$\beta Si_3N_4$ as a matrix in a ceramic fiber reinforced composite to achieve high specific strength, high first matrix cracking stressed and toughness without exhibiting any pesting or cracking during long-term thermal cycling at high and low temperatures. Silicon carbide fibers comprise a preferred reinforcing fiber.

According to a first preferred composition of the invention, there's provided $MoSi_2$ based matrix materials containing at least about 20 percent by volume $\beta$-$Si_3N_4$ whisker type grains based on the combined volume of the $MoSi_2$ and the $\beta$-$Si_3N_4$. More preferably, the compositionof the invention comprises from about 30 to about 50 percent by volume $\beta$-$Si_3N_4$ based on the combined volume of the $MoSi_2$ and $\beta$-$Si_3N_4$.

The achievement of the whisker type β-Si$_3$N$_4$ grains is enhanced by the use of rare earth oxide sintering aids. The rare earth oxides are nano sized. Preferred rare earth oxides include Y$_2$O$_3$ and Al$_2$O$_3$. The sintering aids are used in amounts ranging from 2 to 6 percent by weight based on the combined weight of the MoSi$_2$ and β-Si$_3$N$_4$.

A preferred fiber reinforced composite comprises the above noted MoSi$_2$-βSi$_3$N$_4$ composition as a matrix material and ceramic reinforcing fiber. The reinforcing fiber is interspersed with the matrix material. The matrix material comprises at least about 50 percent, and more preferably about 70 percent by volume of the composite based on the combined volume of the matrix material and the β-Si$_3$N$_4$ reinforcing fiber. In more preferred arrangements, the reinforcing fiber is a silicon carbide fiber, and it is present in the matrix in an amount of about 30 percent by volume based on the combined volume of the matrix and the reinforcing fiber.

In accordance with the method of the present invention and preferred processing, mixtures of MoSi$_2$ and Si$_3$N$_4$ are blended and milled to micrometer particle size with the prior addition of sintering aids. The mixtures are formed into thin sheets or plates using vacuum hot pressing to achieve a relatively high green density. This first stage is followed by hot isostatic pressing to achieve full density as well as growth of whisker type grains of β-Si$_3$N$_4$. This two stage processing with the use of sintering aids enables reduction of the maximum heating temperature without reduction of the final level of densification.

DETAILED DESCRIPTION OF THE INVENTION

Figure 1:
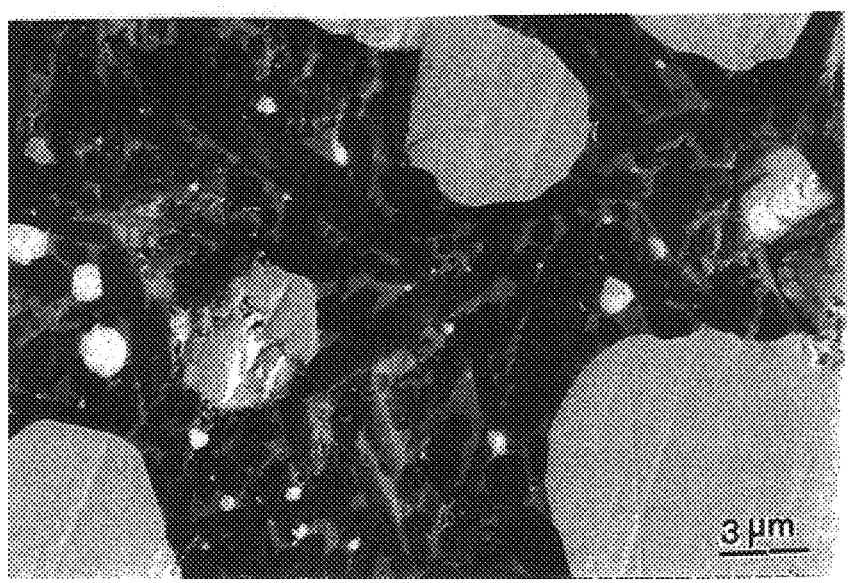
FIG. 1 is a SEM-BS image showing the long whisker type β-Si$_3$N$_4$ grains randomly distributed in a MoSi$_2$ matrix.

The in-situ reinforced MoSi$_2$-βSi$_3$N$_4$ yields a highly developed microstructure characterized by desirable physical properties. The in-situ reinforced materials have a lower density (4.5 g/cc) than nickel or cobalt based superalloys (about 8.5 g/cc). In addition, higher fracture toughness (about 20 MPa(m)$^{0.5}$) and impact resistance at room and operating temperatures as compared with SiC/SiC. The in-situ reinforced alloys also provide improved damage tolerance, reliability and creep resistance as compared with SiC/SiC. Also, higher thermal and electrical conductivities are achieved than with SiC/SiC. As noted above, the in-situ reinforced materials also enable low cost EDM and laser machining. It should be appreciated that the SiC/SiC materials are more costly since they employ fibers and coatings.

In accordance with the invention, mixtures of MoSi$_2$ and Si$_3$N$_4$ are blended and milled to obtain an average particle size of less than about two micrometers in diameter. The mixtures are then consolidated into thin sheets or plates using vacuum hot pressing to achieve a relatively high density, e.g., 90 percent green density. Full density as well as growth of whisker type grains of β-Si$_3$N$_4$ are achieved with hot isostatic pressing. In this manner, the α-Si$_3$N$_4$ particles are transformed into β-Si$_3$N$_4$ as randomly oriented long whiskers that are well dispersed in the MoSi$_2$ matrix.

EXAMPLE 1

MoSi$_2$ based alloys consisting essentially in amounts by volume percent of about 30 to 50 percent Si$_3$N$_4$ having a particle size of one to two microns were prepared in the following manner. The Si$_3$N$_4$ obtained from UBE Inc. was ground in a Union Process Model 1-S attritor mill for about eight hours using WC grinding media. The grinding media had a diameter of about six mm, and a ball to powder ratio of 20 was used to reduce about 95 percent of the particles to a size of less than two microns.

MoSi$_2$ powder having at least 98.5 percent purity and a −325 mesh size was obtained from Johnson Matthey Inc., (Aesar Inc.). The MoSi$_2$ powder was combined with the ground Si$_3$N$_4$ and about 2–6% by weight sintering aids. The sintering aids were nano size rare earth oxides such as Y$_2$O$_3$ and Al$_2$O$_3$ obtained from Nanotek Inc.

Three batches of about 530 grams each were prepared as described above, and combined in a SiC jar mill containing about 1500 grams of silicon carbide grinding media in the form of six mm diameter balls. The combined batches were milled for about 24 hours.

The combined batches were then further milled in the Union Process Model Research 1-S attritor with an impeller rotation speed out 450 rpm for eight hours using six mm diameter WC grinding media. The ball to powder ratio was 20:1. The outer jacket of the attritor was cooled with flowing liquid nitrogen to promote efficient grinding. After eight hours of milling, the powder was separated anaerobically from the grinding media in a glovebox containing an argon atmosphere. The resulting powder mixture had an average mean particle size of 1.25±0.71 micrometers at 99 percent confidence.

The powder mixture was consolidated into a 12 cm long by 5 cm wide by 0.3 cm thick plate by vacuum hot pressing at 1600° C. and 128 MPa or 1800° C. and 84 MPa for four hours to achieve more than 90 percent green density. The hot pressed plate was enclosed in a tantalum hot isostatic press (HIP) canister together with a silicon carbide back-up plate. The HIP canister was sealed using electron beam welding. Further consolidation of the hot pressed plate was achieved by hot isostatic pressing between 1800–1900° C. and 300 MPa for two hours. During hot isostatic pressing, full densification as well as growth of whisker type grains of β-Si$_3$N$_4$ were achieved. The use on the sintering aids and the two-step consolidation process enabled the use of lower temperatures then could be used if hot pressing were done alone for purposes of growing β-Si$_3$N$_4$ grains. (e.g. if hot pressing alone were used, the required temperature would be in the range of 2000–2100° C. at 126 MPa for four hours.) This resulted in fully dense and β-Si$_3$N$_4$ grained microstructure as shown in FIG. 1. The α-Si$_3$N$_4$ particles are transformed into β-Si$_3$N$_4$ as randomly oriented long whiskers that are well dispersed in the MoSi$_2$ matrix. The β-Si$_3$N$_4$ whiskers appear to be quite stable, with very little or no reaction with the MoSi$_2$ even at 1900° C. In some isolated areas the Mo$_5$Si$_3$ phase was detected. This is believed to be due to the lack of stoichiometry in commercially available MoSi$_2$.

The fracture toughness of the materials in accordance with Example 1 was measured at room temperature by preparing ASTM chevron notched bend specimens. For purposes of testing, a second duplicate batch of materials was prepared and the samples are referred to below as being of batch 1 or batch 2. The fracture testing was done at room temperature using an Instron test machine fitted with a four point bend fixture.

From the load displacement data and specimen dimensions, the valid $K_{Ic}$ was calculated using a slice finite element model. The slice model is based on the relationship:

$$K_{Ic} = [P(S_1 - S_2)Y^*]/(W^3/2)$$

Where $K_{Ic}$ is the fracture toughness in $MPa(m)^{.5}$,

P is the load at break in MPa, $S_1$ and $S_2$ define the gripped sample span,

Y is a sample geometry constant,

B is the sample thickness in mm,

W is the sample width in mm,

TABLE 1

| Sample | B (mm) | W (mm) | $\alpha_o$ | $A_1$ | $Y^*$ | P (N) | $K_{Ic}$ (MPa (m)$^{.5}$) |
|---|---|---|---|---|---|---|---|
| Batch I | | | | | | | |
| MS-1 | 3 | 6 | 1.2 | 4.8 | 3.28 | 194.9 | 14.02 |
| MS-2 | 3 | 6 | 1.2 | 4.8 | 3.28 | 208.9 | 14.96 |
| MS-3 | 3 | 6 | 1.2 | 4.8 | 3.28 | 273.4 | 20.2 |
| Batch II | | | | | | | |
| MS-4 | 3 | 6 | 1.2 | 4.8 | 3.28 | 250.4 | 18.0 |
| MS-5 | 3 | 6 | 1.2 | 4.8 | 3.2 | 262 | 18.9 |
| MS-6 | 3 | 6 | 1.2 | 4.8 | 3.28 | 208.5 | 16.0 |
| Average | | | | | | | 17.0 |

$\alpha_o$, $A_1$ and $Y^*$ are constants based on sample geometry
MATERIAL ID: $MoSo_2$-$\beta 50Si_3N_4$
TEST TEMP.: ROOM TEMP
CROSS HEAD SPEED: $8.5 \times 10^{-5}$ s$^{-1}$
POISSON'S RATIO: 0.32

The average $K_{Ic}$ of this material was about 17 $MPa(m)^{0.5}$. The room temperature fracture toughness of $MoSi_2$-$Si_3N_4$ without the whiskers of $\beta$-$Si_3N_4$ was about 5.0 $MPa(m)^{0.5}$. Accordingly, the $\beta$-$Si_3N_4$ whiskers improved the fracture toughness by more than a factor of three as compared with the $Si_3N_4$ particulate in $MoSi_2$.

The in-situ $Si_3N_4$ toughened $MoSi_2$ has a higher fracture toughness than commercially available in-situ toughened $Si_3N_4$. For example, AS-800 has a fracture toughness of about 8.5 $MPa(m)^{0.5}$ and NKK has a fracture toughness of about 10 $MPa(m)^{0.5}$. The higher fracture toughness of $MoSi_2$-$\beta$-$Si_3N_4$ as compared to in-situ toughened $Si_3N_4$ is believed to be derived from the combined effects of efficient crack bridging, grain pull-out (due to weak bonding with $MoSi_2$ matrix) of highly elongated $Si_3N_4$ grains and the larger grain size of $MoSi_2$. The primary toughening mechanisms such as crack bridging and grain pull-out lead to a rising crack growth resistance curve (R-curve behavior) as confirmed by the testing of this material using the indentation crack size, indentation-strength method, SEPB and chevron notched bend method as indicated by the data of Table 1. A consequence of this R-curve is that this material will have a higher Weibull modulus.

Figure 2:
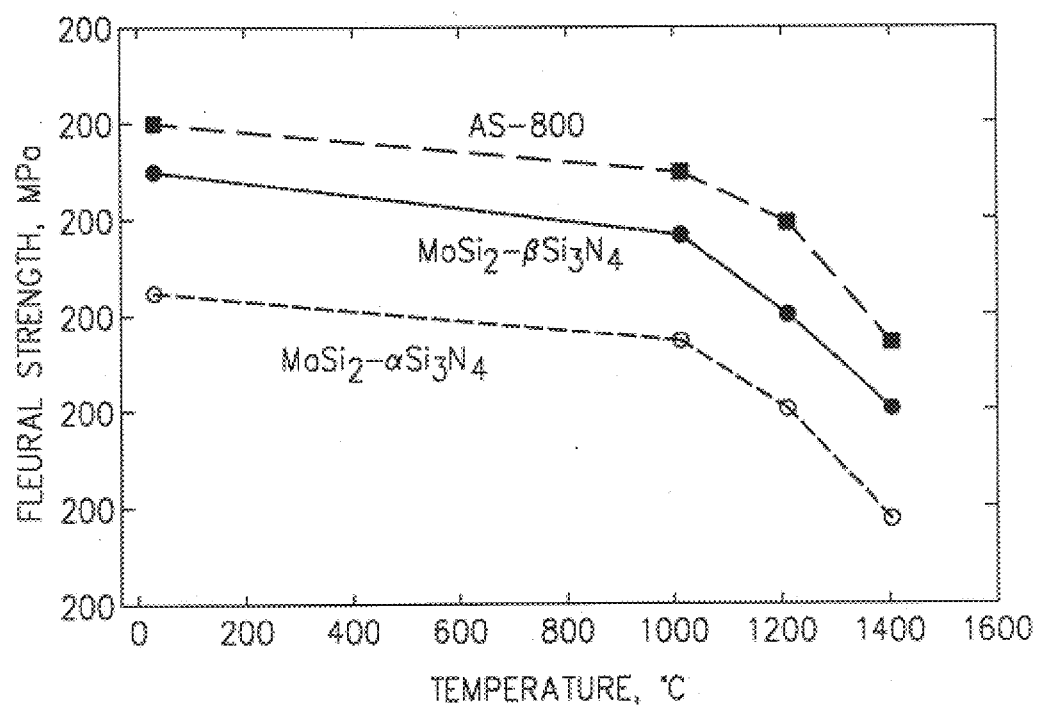
FIG. 2 is a plot showing the flexural strength at various temperatures for MoSi$_2$-βSi$_3$N$_4$ and AS-800.

The flexural strength of the material of Example 1 was measured using ASTM standard specimens (3 mm thick by 6 mm wide by 50 mm long MOR bars) of $MoSi_2$-$\beta Si_3N_4$ at various temperatures between room temperature and 1400° C. in air. FIG. 2 shows the flexural strength of $MoSi_2$-$\beta Si_3N_4$, $MoSi_2$-$\alpha Si_3N_4$ and AS-800 as a function of temperature. FIG. 2 clearly indicates that the strength of AS-800 is superior to $MoSi_2$-$\beta Si_3N_4$ at all temperatures. Also, the strength of $MoSi_2$-$\beta Si_3N_4$ is higher than $MoSi_2$-$\alpha Si_3N_4$. As an intermetallic compound, the $MoSi_2$ offers significant potential for further improving the strength by solid solution alloying.

High-temperature cyclic oxidation test were carried out on rectangular coupons of $MoSi_2$-$50\beta Si_3N_4$ at 1000° and 1350° C. in air for about 100 cycles. Each cycle consisted of one hour heating followed by 0.3 hours of cooling. The material of example 1 exhibited a parabolic oxidation behavior with weight gain of only 0.03 and 0.4 mg/cm2 at 1000° and 1350° C. respectively. These weight gain values are smaller than those obtained for AS-800 (0.06 and 0.63 at 1000° and 1350° C. respectively). The x-ray diffraction of the oxidized surface of $MoSi_2$-$\beta Si_3N_4$ indicated strong peaks of $SiO_2$, a protective scale.

Figure 3:
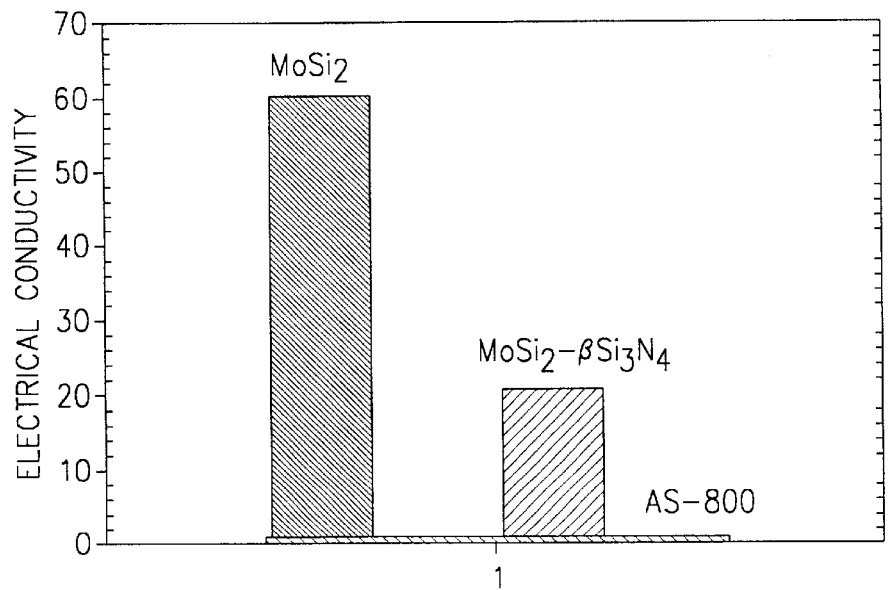
FIG. 3 is a graphical comparison of the electrical conductivity of various materials.

The ability of a material to undergo electro-discharge machining (EDM), a widely accepted low-cost machining technique, is indicated by its electrical conductivity. Room temperature electrical conductivities of various $MoSi_2$ based materials and $Si_3N_4$ based materials were measured using MOR bars (6 mm wide by 3 mm thick by 50 mm long). As shown in FIG. 3, the electrical conductivity of $MoSi_2$-$\beta Si_3N_4$ based material is more than an order of magnitude higher than the conductivity of AS-800 materials, and EDM may be used with the former but not the latter.

Figure 4:
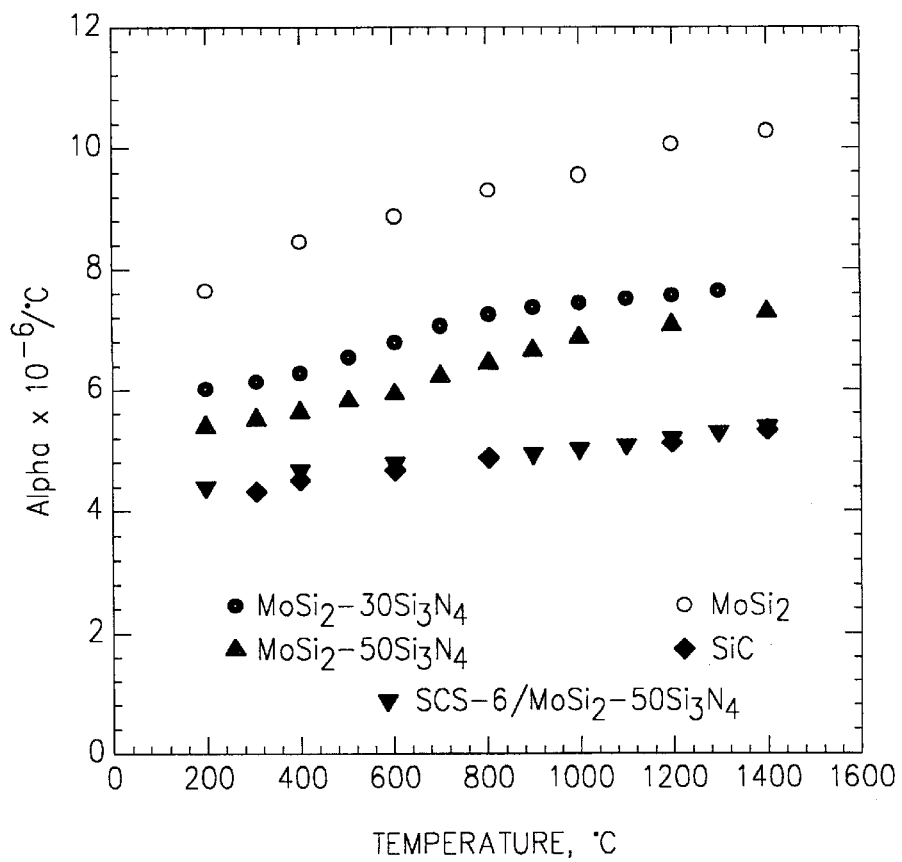
FIG. 4 is a plot showing the reduced coefficient of thermal expansion for MoSi$_2$ compounds with in-situ β-Si$_3$N$_4$ whiskers.

Referring to FIG. 4, the coefficient of thermal expansion for $MoSi_2$ compounds reinforced with in-situ grown $\beta$-$Si_3N_4$ whiskers is compared with non-reinforced $MoSi_2$ and possible reinforcing fiber material such as SiC at various temperatures. As shown, the coefficient of thermal expansion is increasingly reduced for 30 and 50% volume percent $\beta$-$Si_3N_4$ whiskers as indicated by samples $MoSi_2$-$30Si_3N_4$ and $MoSi_2$-$50Si_3N_4$. In a further comparison, $MoSi_2$ reinforced with 50% by volume $\beta$-$Si_3N_4$ and 30% by volume SCS-6 silicon carbide fibers has a coefficient of thermal expansion very close to that of SiC. The reduction of the coefficient of thermal expansion in accordance with the invention thereby provides a better match with possible reinforcing fibers.

Many modifications and variations of the invention will be apparent to those skilled in the art in light of the foregoing detailed than disclosure. Therefore, within the scope of the appended claims, the invention can be practiced otherwise than as specifically shown and described.

What is claimed is:

1. A pest resistant composition for use in high temperature structural materials comprising molybdenum disilicide and whiskers of $\beta$-$Si_3N_4$.

2. A pest resistant composition as in claim 1, wherein said whiskers of $\beta$-$Si_3N_4$ are formed in situ.

3. A pest resistant composition as in claim 2, wherein said whiskers of $\beta$-$Si_3N_4$ comprise at least about 20% by volume whiskers of $\beta$-$Si_3N_4$ based on the combined volume of said molybdenum disilicide and whiskers of $\beta$-$Si_3N_4$.

4. A pest resistant composition as in claim 2, wherein said whiskers of $\beta$-$Si_3N_4$ comprise 30 to 50% by volume whiskers of $\beta$-$Si_3N_4$ based on the combined volume of said molybdenum disilicide and whiskers of $\beta$-$Si_3N_4$.

5. A pest resistant composition as in claim 2, wherein said composition further includes ceramic reinforcing material.

6. A pest resistant composition as in claim 5, wherein said ceramic reinforcing material comprises silicon carbide fibers.

7. A pest resistant composite for use as a high temperature structural material comprising a matrix material including molybdenum disilicide and in situ formed whiskers of $\beta$-$Si_3N_4$, and ceramic reinforcing material interspersed with said matrix material.

8. The composite of claim 7, wherein said matrix material comprises at least 20% by volume whiskers of $\beta\text{-Si}_3\text{N}_4$ based on the combined volume of said molybdenum disilicide and whiskers of $\beta\text{-Si}_3\text{N}_4$.

9. The composite of claim 7, wherein said matrix material comprises 30 to 50% by volume whiskers of $\beta\text{-Si}_3\text{N}_4$ based on the combined volume of said molybdenum disilicide and whiskers of $\beta\text{-Si}_3\text{N}_4$.

10. The composite of claim 7, wherein said ceramic reinforcing material comprises silicon carbide fibers.

* * * * *

UNITED STATES PATENT AND TRADEMARK OFFICE
CERTIFICATE OF CORRECTION

PATENT NO. : 6,391,811 B1
DATED : May 21, 2002
INVENTOR(S) : Hebsur

It is certified that error appears in the above-identified patent and that said Letters Patent is hereby corrected as shown below:

Title page, Item [54] and Column 1, line 1,
Please delete "MOSI$_2$-BASED" and insert therefor -- MoSi$_2$-BASED --.
Line 3, please delete "β-SI$_3$N$_4$" and insert therefor -- β-Si$_3$N$_4$ --.

Column 2,
Line 64, please delete "compositionof" and insert therefor -- composition of --.

Column 5,
Line 11, please delete "*Y* is *a*" and insert therefor -- *Y* is a --.

Signed and Sealed this

Twenty-third Day of July, 2002

*Attest:*

JAMES E. ROGAN
*Director of the United States Patent and Trademark Office*

*Attesting Officer*